Sept. 30, 1952  J. F. SEARS  2,611,982
MINNOW DIPPER
Filed May 4, 1950
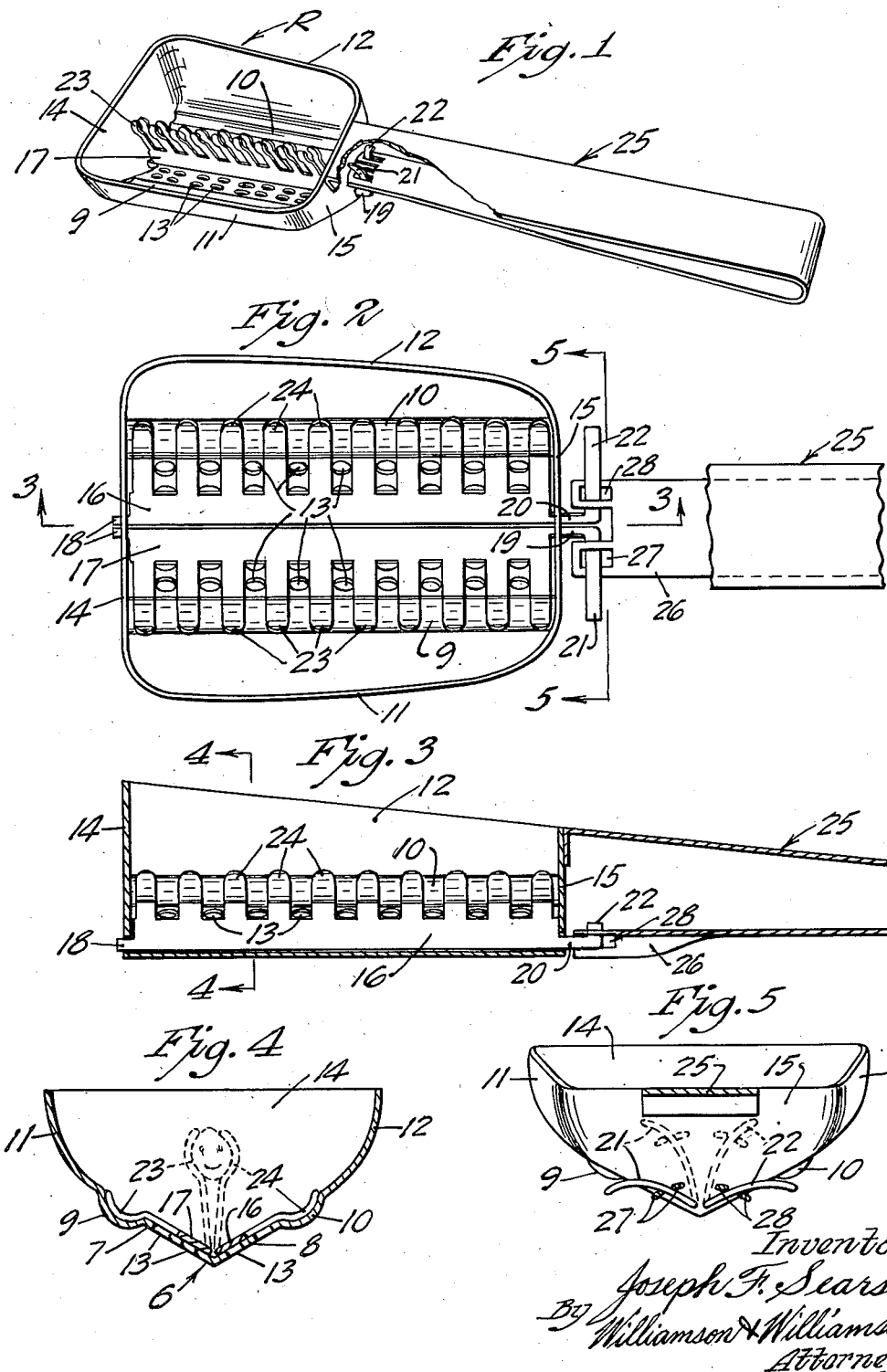

Patented Sept. 30, 1952

2,611,982

UNITED STATES PATENT OFFICE 2,611,982

MINNOW DIPPER

Joseph F. Sears, Minneapolis, Minn.

Application May 4, 1950, Serial No. 159,889

7 Claims. (Cl. 43—11)

This invention relates to dip devices for use by fishermen in catching and holding minnows and other aquatic bait.

Small dip devices have been widely used heretofore for extracting minnows from a bait bucket. Most of these devices, however, require the fisherman to thereafter grasp the minnow with his fingers and attempt to hold it thusly while impaling it upon a hook. This, as every fisherman knows, is a difficult operation since the live minnow is very slippery and wiggles and thrashes about considerably. The difficulty of such an operation is magnified in cold weather since the fisherman's fingers are often numb with cold and are made even more so by the necessary handling of the wet minnow while impaling the same upon the hook.

It is an object of my invention to provide a dip device which may be used for readily catching a minnow or live aquatic bait, maneuvering the same into proper position for impalement upon a hook, and for holding it in such position while the hook is applied thereto.

Another object is to provide a dip device which may be used to catch and hold a minnow in proper position for impalement upon a hook which will eliminate the need for the fisherman to touch the minnow with his hands.

Another object is to provide a dip device for catching minnows and the like which will have handle-actuated positive means included therein for catching and holding a minnow in proper position for impalement upon a hook.

A further object is to provide a dip device adapted to catch and hold a minnow of any length desired without requiring a large opening in the top of the minnow bucket in conjunction with which the device is used.

These and other objects and advantages of my invention will more fully appear from the following description made in connection with the accompanying drawings, wherein like reference characters refer to similar parts throughout the several views and, in which:

Fig. 1 is a perspective view of one embodiment of my device;

Fig. 2 is a top plan view of the dip device with the upper handle portion broken away to show the gripping member actuating portion of the same;

Fig. 3 is a longitudinal vertical sectional view taken along line 3—3 of Fig. 2;

Fig. 4 is a transverse sectional view along line 4—4 of Fig. 3;

Fig. 5 is a sectional view taken along line 5—5 of Fig. 2.

In the embodiment illustrated my dip device comprises a receptacle designated as an entirety by the letter R having a substantially V-shaped bottom 6 formed of a pair of upwardly and outwardly extending panels 7 and 8. As best shown in Fig. 4, these panels 7 and 8 have their lower edges connected and have an outwardly extending groove 9 and 10 extending longitudinally thereof adjacent their upper and outer edges. Secured to the upper and outer edges of the bottom panels 7 and 8 is a pair of substantially vertical side walls 11 and 12. The bottom panels 7 and 8 each have a plurality of apertures 13 formed therein. The receptacle R has an open top as shown and is provided with a forward end wall 14 and a rear end wall 15.

Pivotally mounted adjacent the lower portion of the V-shaped bottom 6 in apertures provided therefor in the end walls 14 and 15 is a pair of substantially parallel and opposite plate members 16 and 17. Each of the plate members 16 and 17 has a pivot portion 18 which extends forwardly from the forward end of the plate member and is carried by the aperture provided therefor in the front wall 14. Extending rearwardly from each of the plate members 16 and 17 adjacent their lower edges is a pivot arm 19 and 20 which extends rearwardly through the aperture provided therefor in the rear wall 15 and then is bent outwardly at substantially right angles in opposite directions. This forms a laterally extending portion 21 and 22 which is bent so as to curve upwardly and then downwardly as best shown in Fig. 5.

Each of the plate members 16 and 17 is provided with a plurality of outwardly and upwardly extending gripping fingers 23. These gripping fingers 23 are spaced relative to each other as best shown in Figs. 2 and 3 and extend upwardly from the lower portion of the V-shaped bottom substantially parallel to the panels 7 and 8. The outer portions of the gripping fingers 23 are curved outwardly and then inwardly as shown in Fig. 4 to provide a minnow gripping portion 24 which is adapted to rest within and in nesting relation to the grooves 9 and 10 when the fingers are in relaxed position.

Extending rearwardly from the upper portion of the rear end wall 15 is a resilient handle member 25 which curves downwardly and reverses upon itself at its medial portion and then extends forwardly to a point adjacent the rear wall 15. The free end 26 of the handle member 25 is provided with a pair of forwardly extending eyelets 27 and 28. The material from which the eyelets 27 and 28 are formed has its outer portion curved downwardly as best shown in Fig. 5. The laterally extending portions 21 and 22 of the arms 19 and 20 extend through the eyelets 27 and 28 to provide actuating mechanism for the plate members 16 and 17 and their gripping fingers 23.

In operation, the fisherman grasps my dip device by the handle member 25 and dips the receptable R within the interior of the minnow bucket to a point below the minnow desired and then lifts upwardly with a quick movement whereupon the minnow will be caught within the receptacle R. The water will quickly drain downwardly through the apertures 13 provided in the bottom 6 of the receptacle R, leaving the minnow lying upon the lower portions of the plate members 16 and 17. Because of the substantially V-shape of the bottom 6 the minnow through its wiggling and thrashing about will of itself assume a belly-downward position upon the plate members 16 and 17. The fisherman then compresses or squeezes the handle member 25 whereupon the forwardly extending portion will be caused to be moved upwardly and to move the laterally extending portions 21 and 22 of the arms 19 and 20 upwardly with it. This upward movement of the laterally extending portions 21 and 22 of the arms will cause the plate members 16 and 17 to pivot so that the plate members will be brought toward each other and the minnow will be squeezed upwardly therebetween. When the minnow has moved upwardly to a position between the gripping fingers 23 the outwardly curved portions 24 thereof will accommodate the minnow and the inwardly extending tips thereof will firmly grasp the same so as to preclude its escape. Thus the minnow will be held firmly in an immovable position so that the fisherman may apply his hook either through the mouth of the minnow or through its body directly beneath its backbone. Thereafter the fisherman need only release the handle whereupon the eyelet carrying portion 26 will move downwardly and cause the laterally extending portions 21 and 22 of the arms 19 and 20 to move downwardly therewith and to cause the plate members 16 and 17 with their respective gripping fingers 23 to return to a position substantially parallel to the V-shape bottom 6. The dip device is then ready for a repeat operation.

It should be noted that the entire operation described above can be performed with a minimum of effort and inconvenience to the fisherman. The minnow is automatically presented in proper position for impalement upon the hook. The spaced fingers 23 provide ample room for the insertion of the hook at whatever angle and in whatever portion of the minnow it is desired. The entire operation can be performed without the fisherman even touching the minnow and without requiring him to wet his hands. This feature is a distinct advantage over any dip device previously known. It is a highly desirable one in that it reduces the discomfort and clumsiness of the fisherman in baiting his hook during cold weather.

It should be noted also that by utilizing my dip device a fisherman may catch and hold a minnow of any desired size. He is not limited in his selection by the width of the opening in the minnow bucket since the receptacle R is inserted therethrough longitudinally rather than transversely and, of course, the minnow is withdrawn in a similar relation. A fisherman may catch and grasp for impalement upon the hook a minnow of relatively large or of relatively small size depending upon his selection. My dip device will accommodate any size of minnow and operate equally efficiently irrespective of the size of the minnow selected.

It will, of course, be understood that various changes may be made in the form, details, arrangement and proportions of the various parts without departing from the scope of my invention.

What I claim is:

1. A dip device for catching and holding minnows and the like comprising a foraminous dip receptacle having a bottom and an open top, at least one pair of co-operating movable gripping elements mounted within said receptacle adjacent its bottom for positively engaging and holding a minnow, and mechanism for activating said gripping elements when desired to cause the same to engage and hold a minnow for impalement upon a hook.

2. A dip device for catching and holding minnows and the like comprising a foraminous dip receptacle having a bottom and an open top, a plurality of cooperating movable gripping elements mounted within said receptacle adjacent its bottom for positively engaging and holding a minnow, and a handle extending outwardly from said receptacle, said handle being adapted as a result of simultaneous pressure upon the upper and lower surfaces thereof to activate said gripping elements when desired to cause the same to engage and hold a minnow for implement upon a hook.

3. A dip device for catching and holding minnows and the like comprising a foraminous dip receptacle having an open top and a substantially V-shaped bottom, a plurality of co-operating oppositely movable gripping elements mounted within said receptacle along the sides of said bottom for positively engaging and holding a minnow, and means for activating said gripping elements when desired to cause the same to engage and hold a minnow for impalement upon a hook.

4. A dip device for catching and holding minnows and the like comprising a foraminous dip receptacle having a bottom and an open top, a pair of pivotally mounted and opposed plate members connected to said bottom, each of said plate members having a plurality of outwardly extending gripping fingers adapted to co-operate with the gripping fingers on the opposite plate member to positively engage and hold a minnow, and mechanism for activating said plate members and their gripping fingers when desired to cause the latter to engage and hold a minnow for impalement upon a hook.

5. The structure defined in claim 4, at least a portion of said mechanism forming a handle for said receptacle.

6. A dip device for catching and holding minnows and the like comprising a foraminous dip receptacle having a bottom and an open top, a pair of plate members swingably and oppositely mounted adjacent said bottom, each of said plate members having a plurality of outwardly extending gripping fingers adapted to co-operate with the gripping fingers on the opposite plate member when activated to positively engage and hold a minnow therebetween and each plate member having an angularly shaped arm extending rearwardly from its rear end portion through said receptacle, said plate members and their gripping fingers normally lying along said bottom, and a handle member extending outwardly from said receptacle, said handle member having a reversely curved portion, the free end of which is adapted to co-operate with said arms when squeezed toward said outwardly extending portion of said handle to activate said plate members and their gripping fingers to cause the latter to engage and hold a minnow for impalement upon a hook.

7. A dip device for catching and holding minnows and the like comprising a foraminous dip receptacle having an open top and a generally V-shaped bottom, a pair of substantially parallel and opposite plate members pivotally mounted within said receptacle adjacent the lower portion of said V-shaped bottom and extending longitudinally thereof, each of said plate members having a plurality of outwardly extending gripping fingers adapted to co-operate with the gripping fingers on the opposite plate member to positively engage and hold a minnow, and a handle extending from said receptacle, said handle including mechanism for activating said plate members and their gripping fingers when desired to cause the latter to engage and hold a minnow for impalement upon a hook.

JOSEPH F. SEARS.

REFERENCES CITED

The following references are of record in the file of this patent:

UNITED STATES PATENTS

| Number | Name | Date |
|---|---|---|
| 551,580 | Coulson et al. | Dec. 17, 1895 |
| 597,340 | Ward | Jan. 11, 1898 |
| 2,095,913 | Braz | Oct. 12, 1937 |
| 2,480,924 | Heger | Sept. 6, 1949 |
| 2,539,563 | Baloun | Jan. 30, 1951 |